United States Patent
Watanabe et al.

(10) Patent No.: US 7,194,396 B2
(45) Date of Patent: Mar. 20, 2007

(54) SIMULATION DEVICE

(75) Inventors: Atsushi Watanabe, Tokyo (JP);
Yoshiharu Nagatsuka, Yamanashi (JP);
Katsuyuki Kuribayashi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 639 days.

(21) Appl. No.: 10/290,538

(22) Filed: Nov. 8, 2002

(65) Prior Publication Data
US 2003/0090491 A1  May 15, 2003

(30) Foreign Application Priority Data
Nov. 9, 2001 (JP) ............................ 2001-344933

(51) Int. Cl.
*G06G 7/48* (2006.01)

(52) U.S. Cl. ............................. 703/7; 386/46; 386/73; 386/80; 386/131; 345/418; 345/606; 345/619; 345/475

(58) Field of Classification Search ................ 600/484, 600/416; 715/700; 386/83; 707/100; 273/247; 345/419, 629
See application file for complete search history.

(56) References Cited

U.S. PATENT DOCUMENTS

| | | | | |
|---|---|---|---|---|
| 5,517,663 | A * | 5/1996 | Kahn | 345/473 |
| 5,684,918 | A * | 11/1997 | Abecassis | 386/83 |
| 5,850,352 | A * | 12/1998 | Moezzi et al. | 345/419 |
| 6,341,996 | B1 | 1/2002 | Brien et al. | 451/8 |
| 6,504,990 | B1 * | 1/2003 | Abecassis | 386/46 |
| 6,577,315 | B1 * | 6/2003 | Kroitor | 345/473 |
| 6,583,806 | B2 * | 6/2003 | Ludwig et al. | 348/14.08 |
| 2001/0044576 | A1 * | 11/2001 | Vining | 600/416 |
| 2002/0032697 | A1 * | 3/2002 | French et al. | 707/500.1 |

(Continued)

FOREIGN PATENT DOCUMENTS

EP  0 513 369 A1  11/1992

(Continued)

OTHER PUBLICATIONS

Catherine Harmonosky, Dean Barrick☐☐Simulation in a CIM Environment: Structure for Analysis and Real-Time Control☐☐Proceedings of the 1988 Winter Simulation conference.*

(Continued)

*Primary Examiner*—Kamini Shah
*Assistant Examiner*—Cuong Van Luu
(74) *Attorney, Agent, or Firm*—Staas & Halsey LLP

(57) ABSTRACT

A simulation device capable of displaying still images of a three-dimensional model of a machine such as a robot in the midst of an operation of the machine and simulating the operation from a start to the midst of the operation. The simulation device receives historical data (lapsing time information and positional information associated with the lapsing time information) of the operation of the machine to perform the simulation of the operation by displaying an image of the three-dimensional model of the machine by animation. When a capturing trigger signal is issued manually or automatically in the simulation, the image of the three-dimensional model is reduced and stored to be associated with the historical data of the operation of the machine at the issuance of the capturing trigger signal. The obtained reduced images are displayed in time series in the order of lapsing time.

4 Claims, 5 Drawing Sheets

U.S. PATENT DOCUMENTS

| | | | |
|---|---|---|---|
| 2002/0105529 A1* | 8/2002 | Bowser et al. | 345/629 |
| 2002/0151992 A1* | 10/2002 | Hoffberg et al. | 700/83 |
| 2003/0190954 A1* | 10/2003 | Sitrick | 463/35 |
| 2003/0227472 A1* | 12/2003 | Westinskow et al. | 345/700 |
| 2004/0046736 A1* | 3/2004 | Pryor et al. | 345/156 |
| 2005/0010117 A1* | 1/2005 | Agutter et al. | 600/484 |
| 2005/0171964 A1* | 8/2005 | Kulas | 707/100 |
| 2005/0179202 A1* | 8/2005 | French et al. | 273/247 |

FOREIGN PATENT DOCUMENTS

EP　　　1 186 976 A2　　3/2002

OTHER PUBLICATIONS

Glenn Drake, Jeffrey Smith, Brett Peters□□Simulation as a Planning and Scheduleing Tool for Flexible Manufacturing□□Proceedings of the 1995 winter Simulation Conference.*

Ranko Vujusevic□□Object Oriented Visual Interactive Simulation□□Proceedings of the 1990 Winter Simulation Conference.*

Keichmann K et al: "Grafisches NC-Testsystem Zur Umfassenden Simulation" Werkstatt Und Betrieb, Carl Hanser Verlag. Munchen, De, vol. 129, No. ½, Feb. 1, 1996, pp. 26-29.

Koepfer T et al: "Simulation Mit Cosima" VDI Z, VDI Verlag GMBH. Dusseldorf, De, vol. 132, No. 4, Apr. 1, 1990, pp. 18-25.

Schade B et al : Simulation Bei Der NC-Programmierung Ein Weg Zu Hoherer Produktivitat , Feinwerktechnik + Messtechnik, Carl Hanser Verlag. Munchen, De, vol. 98, No. 3, Mar. 1, 1990, pp. CA28-CA31.

Work in Progress, Technical Notes, "3-D Simulation of CNC Machine Tool Operation on a Superminicomputer and on a PC", Journal of Manufacturing Systems .7 (1988) No. 3, Dearborn, Michigan, USA.

* cited by examiner

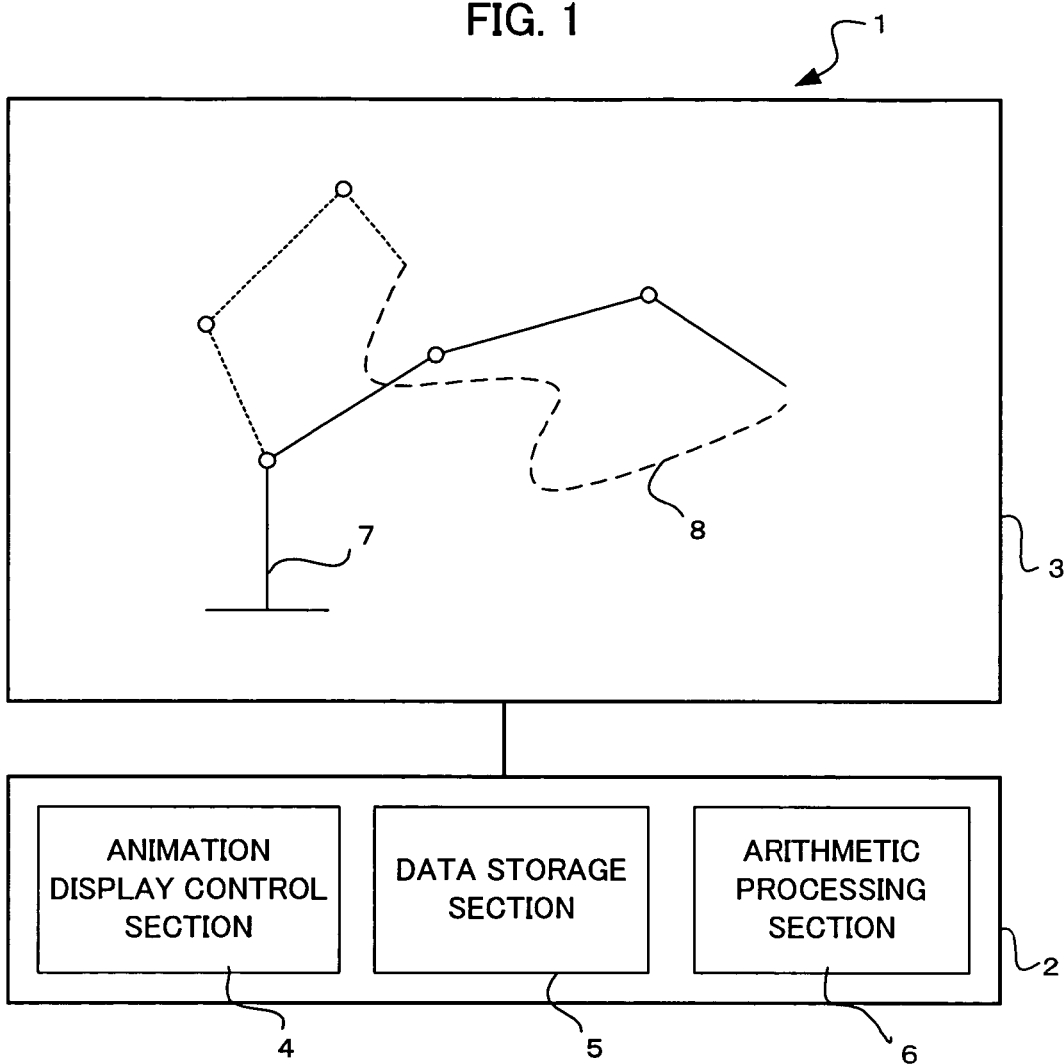
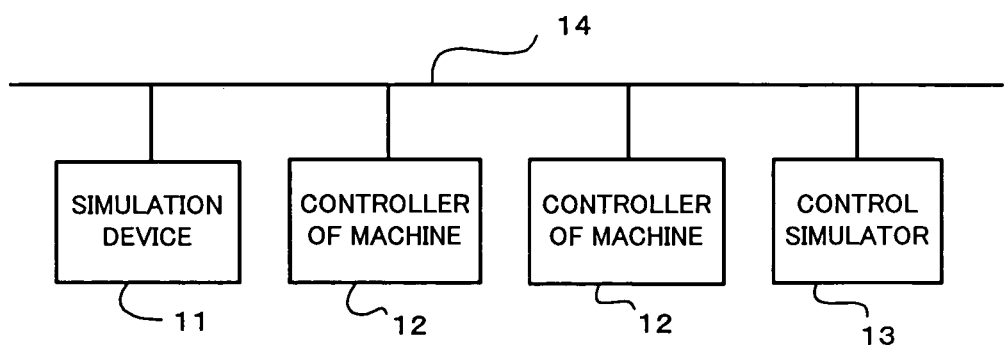

SIMULATION DEVICE

BACKGROUND OF THE INVENTION

1. Field of the Invention

The present invention relates to a simulation device for simulating an operation of a machine, such as a robot and a machine tool, which operates in accordance with an operation program or an operation command.

2. Description of Related Art

There is known a simulation device for simulating an operation of the machine, which operates in accordance with an operation program or an operation command, by displaying an image of a model of the machine on a display device of a computer based on operation command data in a controller of the machine or operation command data obtained by arithmetic processing in the computer.

The conventional simulating device continuously simulates the whole operation of the machine in executing an operation program or operation commands, and is not able to display an operational state of the machine including position and posture of the machine in the midst of the continuous operation or to simulate a part of the operation of the machine to the midst or from the midst of the operation. Particularly, in the simulation of operation of the machine such as a robot, although the simulation of the whole operation of the robot in one cycle thereof is useful, there is a case where it is required to confirm position and posture of the robot at specific points in time in the midst of the operation and operation state of the robot in a specific section in the operation of the robot, i.c. change of motion of the robot in the specific section.

SUMMARY OF THE INVENTION

An object of the present invention is to provide a simulation device capable of displaying state of operation of a machine in the midst of the operation by still image of a model of the machine and simulating a part of the operation by animation.

A simulation device of the present invention simulates an operation of a machine which operates in accordance with an operation program or an operation command. The simulation device comprises: receiving means for receiving lapsing time information of the operation of the machine and positional information of the machine associated with the lapsing time information; simulation display means for displaying an image of a model of the machine on a display device by animation to perform simulation of the operation of the machine based on the received lapsing time information and positional information; capturing means for capturing images of the model of the machine obtained by the simulation display means m the simulation and reduce the captured images of the model of the machine; storing means for storing the reduced images to be associated with the lapsing time information and the positional information to the time of capturing of the respective images of the model of the machine; and display control means for displaying the reduced images on the display device in the order of lapsing time based on the stored lapsing time information, to thereby allowing an operator to observe states of the operation of the machine in the midst of the operation referring to the reduced images of the model of the machine.

The storing means may store the images captured by the capturing means without reducing the images to be associated with the lapsing time information and the positional information to the time of capturing of the respective images of the model of the machine, and the display control means may reduce the captured images and displaying the reduced images on the display device in the order of lapsing time based on the stored lapsing time information.

The simulation device may further comprise arithmetic processing means for executing the operation program or the operation command and the receiving means may receive the lapsing time information of the operation of the machine and the positional information of the machine from the arithmetic processing means. The arithmetic processing means may be a controller of the machine or a device having an arithmetic processing section equivalent to the controller of the machine.

The simulation device may further comprise replay means for replaying a part of the simulation of the operation of the machine designated by at least one reduced image selected by an operator from the reduced images displayed on the display device based on the lapsing time information of the operation of the machine and the positional information of the machine associated with the reduced image selected by the operator.

The replay means may replay the simulation of operation of the machine from a present position of the machine to a target position determined by the positional information associated with the selected image, and command the machine to operate to the position corresponding to the position of the machine in the simulation. In this case, the replay means may display an image of the model of the machine by animation from the present position to the target position of the machine before commanding the machine to operate to the position corresponding to the position of the machine in the simulation.

The replay means may display a locus of a controlled point of the machine on the display device in the replay of the simulation of the operation of the machine.

The simulation device may further comprise replay control means for suspending the replay of the simulation to allow altering of a replay speed of the replay of the simulation and restarting the replay of the simulation. The suspending of the replay of the simulation to alter the replay speed and the restarting of the replay of the simulation may be performed with respect to another machine which operates simultaneously with the machine.

The simulation device may further comprise capturing commanding means for issuing a command for capturing an image of model to the capturing means. The capturing commanding means may automatically issue the capturing command at every predetermined period or in response to a command manually inputted by an operator.

The lapsing time information may include one of time information in execution of the operation program and lapsing time from a start of execution of the operation program. The machine may be an industrial robot or a machine tool.

BRIEF DESCRIPTION OF THE DRAWINGS

FIG. 1 is a schematic block diagram of a simulation device according to a first embodiment of the present invention;

FIG. 2 is a block diagram showing a simulation device in a machine system according to a second embodiment of the present invention;

DETAILED DESCRIPTION OF THE PREFERRED EMBODIMENTS

Figure 3:
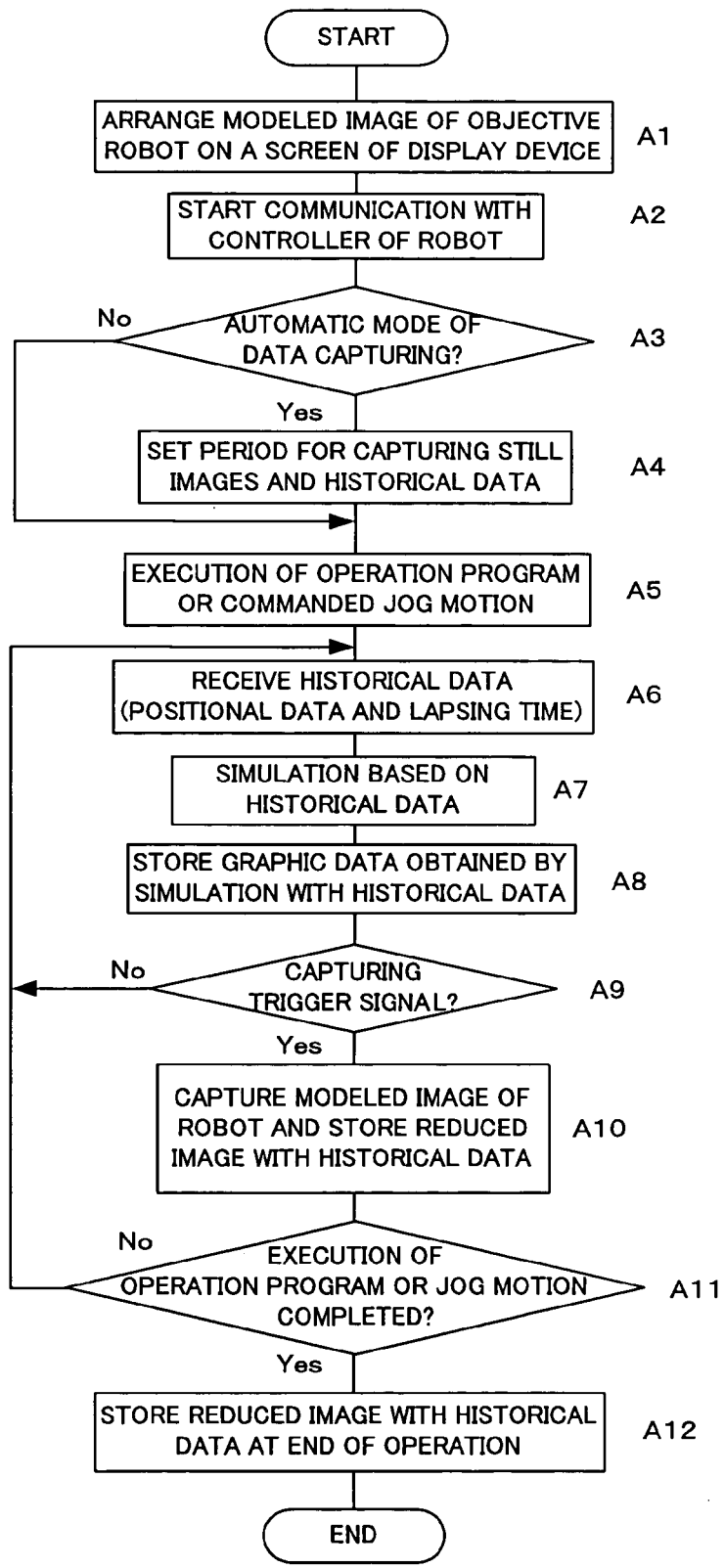
FIG. 3 is a flowchart of processing for simulating an operation of a robot and obtaining graphic data and historical data associated with the graphic data in the simulation.

FIG. 1 shows a simulation device according to a first embodiment of the present invention. A simulation device 1 is constituted by a personal computer (PC) having a display device 3 and a computer body 2. The computer body 2 comprises an arithmetic operation processing section 6 for analyzing an operation program or a manually inputted operation command to obtain operation command data for a machine, a data storage section 5 and an animation display controller 4.

When an operation program for a machine such as a robot and a machine tool is inputted to the simulator 1 through an interface (not shown) from communication line or a storage medium such as flexible disk the arithmetic processing section 6 analyzes the operation program to obtain operation command data (command position data, etc.) and the obtained command data is stored in the data storage section 5. The animation display controller 4 simulates the operation of the machine by moving a modeled image 7 of the machine by animation based on the operation command data of the machine stored in the data storage section 5. Further, a locus 8 of a controlled point of the machine is displayed.

When an operation command for moving the controlled point of the machine is manually inputted to the simulation device 1 through a manual data input device (not shown), the arithmetic processing section 6 obtains operation command data based on the inputted operation command and outputs the obtained command data to the animation display controller 4 through the data storage section 5, so that the operation of the machine according to the manually inputted operation command is simulated by animation.

The simulation device of the present invention displays still images of the model of the machine in time series in the midst of the operation and also simulates a part of the operation to the midst of the operation, as described later.

FIG. 2 shows a simulation device in a network of controllers of machines according to a second embodiment of the present invention. A simulation device 11 in this embodiment may have the same hardware architecture including the arithmetic processing section 6 as the simulation device 1 shown in FIG. 1, or may not have the arithmetic processing section 6. The arithmetic processing performed by the arithmetic processing section 6 can be performed by an arithmetic processing device provided out of the simulation device 11 in this embodiment.

The simulation device 11 is connected with controllers 12 for machines such as robots and machine tools through a communication line 14 and also connected with a control simulator 13 which has the function of the arithmetic processing section 6 in the simulator 1 for analyzing the operation program for the machine to obtain operation command data.

In this embodiment, operation programs for the machines are respectively inputted to the controllers 12 and the control simulator 13 directly or from the simulation device 11 through the communication line 14. In the case of tie simulation device 11 having the arithmetic operation section 6, an operation program may be inputted to the arithmetic operation section 6 of the simulation device 11.

The arithmetic processing sections in the controllers 12 of the machines and the operation simulator 13 respectively analyze the inputted operation programs, and the obtained operation command data are sent to the simulation device 11 through the communication line 14. In the case of the simulation device 11 having tie arithmetic operation section 6, the arithmetic processing section 6 analyzes the inputted operation program and obtained operation command data are stored in the data storage section 5 of the simulation device 11. The simulation device 11 simulates the operation of the machine by moving an image of a three-dimensional model of the machine on the display device 3 by animation based on the operation command data of the machines being received through the communication line 14 or stored in the data storage section 5.

When an operation command is manually inputted to the controller. 12 of the machines, the control simulator 13 or the simulation device 11, the inputted motion command is analyzed by the arithmetic processing section of the controllers 12, the simulators 13 or the simulation device 11, to obtain operation command data for the machine, and the operation of the machine is simulated by animation based on the operation command data. In this embodiment also, the simulation device 11 displays still images of the model of the machine in time series in the midst of the operation and also simulates a part of the operation to the midst of the operation indicated by the still image of the model.

FIG. 3 shows processing for obtaining historical data of an operation of a machine for simulating the operation and displaying still images of the model of the machine in the midst of operation, to be performed on the simulation device 1 as shown in FIG. 1 or the simulation device 11 as shown in FIG. 2. The following description is made on an example in which an operation of a robot as the machine is simulated.

First, one of the three-dimensional models of robots stored in advance is selected as a model of a robot of which an operation is simulated, and an image of the selected model is arranged on a screen of the display device (Step A1). Then, communication between the simulation device and the robot controller is enabled (Step A2). In the first embodiment as shown in FIG. 1, the arithmetic processing section 6 functions as a controller of a robot. In the second embodiment as shown in FIG. 2, communication between the simulation device 11 and one of the controllers 12 and the control simulator 13 through the communication line 14 is enabled, and the arithmetic processing section in the simulation device 11 may function as a controller of a virtual robot.

In the second embodiment as shown in FIG. 2, an operation program for the robot an operation of which is simulated may be sent from the simulation device 11 to the robot controller 12 or the control simulator 13 through the communication line 14 or may be inputted to the robot controller 12 or the control simulator 13 directly.

Then, it is set whether capturing of still images of the three-dimensional model of the robot in the midst of an operation of the robot and historical data associated therewith is to be performed in a automatic mode or a manual mode (Step A3). If the automatic mode is selected, a period at which a still image of the model of the robot and the associated historical data are captured is set (Step A4). A command of executing the operation program or a commanded jog motion is issued to the controller (i.e. the robot controller 12, the control simulator 13, or the arithmetic processing section 6 in the simulation device) for the robot an operation of which is simulated to start execution of the operation program or the command jog motion by the robot controller (Step A5).

Than, an ID code identifying the robot and the historical data comprising the positional information (operation command data) of the robot with the lapsing time information from a start of execution of the operation program (from the issuance of the command of execution of the operation program) sent from the controller of the robot at every predetermined period are received (Step A6). Based on the received historical data, the operation of the robot is simulated by moving the three-dimensional model of the robot by animation on the screen of the display device 3 (Step A7). The lapsing time information may be time information in execution of the operation program or lapsing time from the start of execution of the operation program. Information in a counter counting execution of the operation program in the operation program and the lapsing time form the start of execution of the operation program.

The graphic data of the three-dimensional model obtained by the simulation and the received historical data are stored in the data storage section 5 (Step A8). Then, it is determined whether or not a capturing trigger signal is issued (Step A9). The capturing trigger signal commands capturing of the image of the three-dimensional model in the midst of the operation and the historical data from the start of the simulation to the time when the trigger signal is issued. If it is determined that a trigger signal is not issued, the procedure returns to Step A6 and the processing of Steps A6–A9 is repeatedly executed until a capturing trigger signal is issued. The trigger signal is issued at every period set at Step A4 in the automatic mode and issued in response to a command manually inputted by an operator in the manual mode.

If it is determined that the capturing trigger signal is issued, the image of the three-dimensional model at the time of issuance of the trigger signal is simulation, and the still image is reduced in size to obtain a reduced image as an icon and the reduced image is stored in the data storage section 5 with the historical data from the start of the operation to the issuance of the trigger signal (Step A10). Then, it is determined whether or not the execution of the operation program or the jog motion is completed (Step A11). If the execution of the operation program is not completed or the jog motion is not completed the procedure returns to Step A6, and the processing of Step A6–A11 is repeatedly executed until the execution of the operation program or the jog motion is completed.

Thus, the reduced image of the three-dimensional model of the robot at the time of issuance of the trigger signal and the historical data from the start of the simulation to the issuance of the trigger signal are stored in the data storage section 6 every time when the trigger signal is issued.

When the execution of the operation program is completed or the jog motion is completed, the historical data from the start of execution of the operation program to the end of execution of the operation program and the reduced image (icon) of the three-dimensional model of the robot at the end of the operation program are stored in a pair (Step A12). The historical data and the reduced image of the model of the robot at the end of the simulation are not necessarily stored and the, processing of Step A12 may be omitted.

In the above processing, the captured still image is reduced in size to obtain reduced image as an icon and the reduced image is stored in the data storage section 5. The graphic data of the captured image may be directly stored in the data storage section 5.

Figure 6:
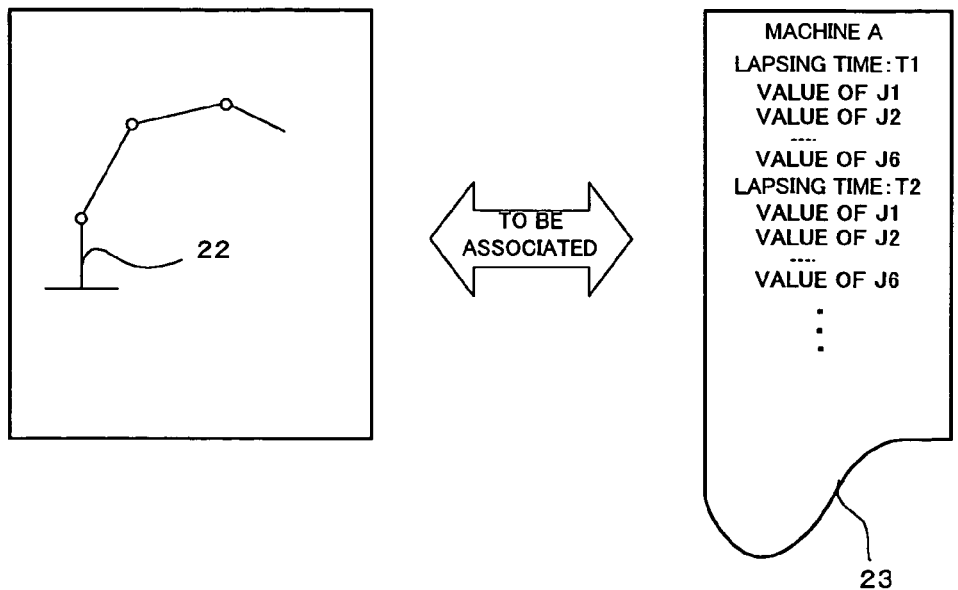
FIG. 6 is a schematic diagram sowing a modeled image of the robot and historical date associated with the modeled image to be captured when a capturing trigger signal is issued.

FIG. 6 shows an example of the reduced image of the three-dimensional model of the machine and the historical data of the operation of the machine stored in the data storage section 5 each time when the capturing trigger signal is issued. The historical data 23 including positional information of respective axis (J1–J6) of the robot and the lapsing time information T1, T2 , . . . from the start of the simulation to the issuance of the capturing trigger signal, and the reduced image 22 of the three-dimensional model when the trigger signal is issued in the simulation are stored in a pair.

Figure 4:
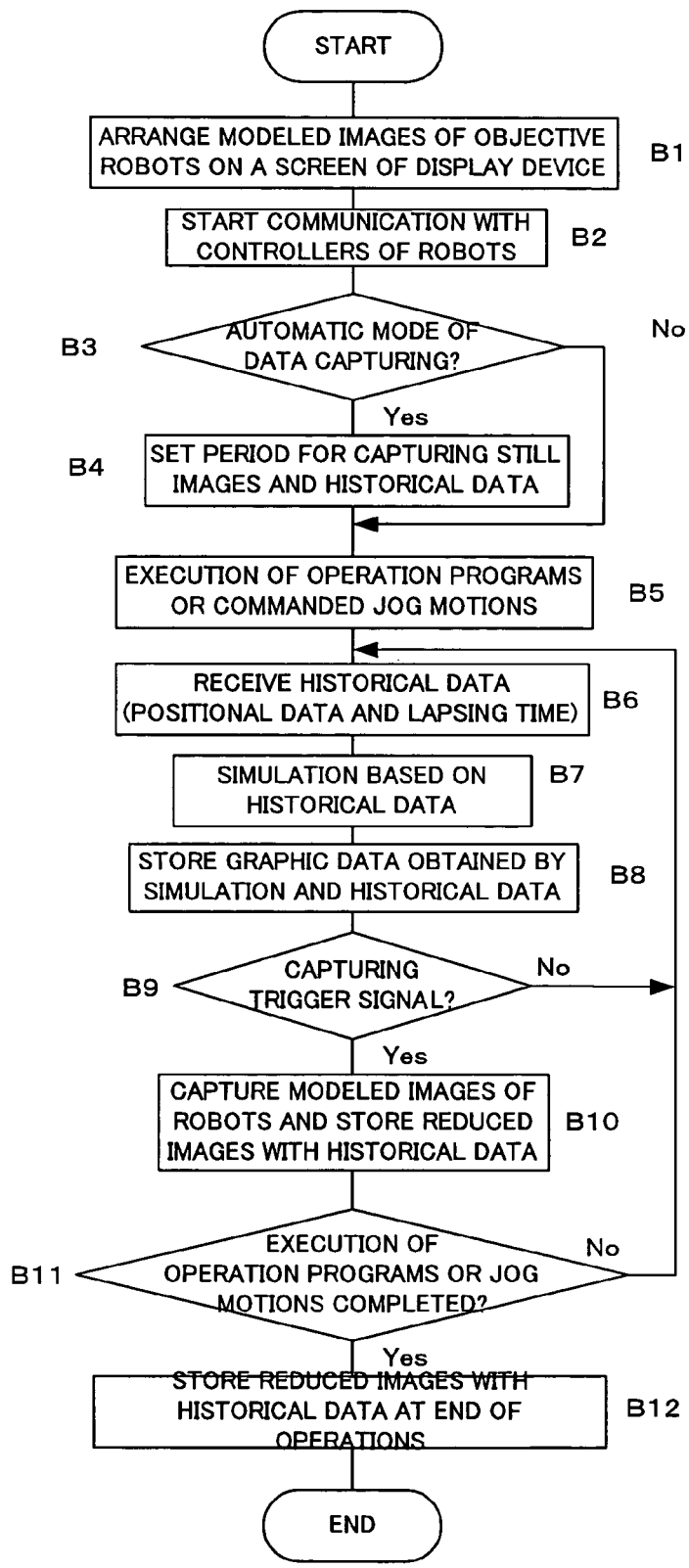
FIG. 4 is a flowchart of processing for simulating operations of a plurality of robots and obtaining graphic data and historical data associated with the graphic data in the simulation.

FIG. 4 shows processing for obtaining still images of the models of a plurality of machines and historical data of operations of the machines such as robots and machine tools in the midst of operations in a system where the machines cooperate with one another.

The processing shown in FIG. 4 differs from the processing shown in FIG. 3 in that operations of the plurality of robots are simulated and the historical data and the reduced images of the models of the robots in the midst of the operations are obtained.

Images of models of robots of which operations are simulated are arranged on a screen of the display device (Step B1). Then, communication between the simulation device and the controllers of the robots of which operations are simulated is enabled (B2). Operation programs for the robots may be sent from the simulation device to the robot controller or the control simulator through the communication line.

If it is determined that the automatic capturing mode is selected (Step D3), a period at which still images of the models of the robots and the associated historical data are captured is set (Step B4). Commands of executing the operation programs or commanded jog motions are issued to the controllers (i.e. the robot controller 12, the control simulator 13, or the arithmetic processing section 6 in the simulation device) for the robots operations of which are simulated, to start execution of the operation programs or the command jog motions by the robot controllers (Step B5).

Then, ID codes identifying the robots and the historical data (positional information and lapsing time information) of the operations of the robots sent at every predetermined period from the controllers of the robots are received (Step B6). Based on the received historical data, the operations of the robots are simulated by moving the three-dimensional models of the robots by animation on the screen of the display device 3 (Step B7).

The graphic data of the three-dimensional models obtained by the simulation and the historical data associated therewith are stored in the data storage section 5 (Step B8) and it is determined whether or not a capturing trigger signal is issued (Step B9.) If it is determined that a trigger signal is not issued, the procedure returns to Step B6 and the processing of Steps B6–B9 is repeatedly executed until a capturing trigger signal is issued.

If it is determined that the capturing trigger signal is issued periodically in the automatic mode or in response to a manually inputted command in the manual mode, the images of the three-dimensional models at the time of issuance of the trigger signal are captured as still images of the models of the robots in the midst of the simulation and the still images are reduced in size to obtain reduced images as an icons and the reduced images are stored in the data storage section 5 with the historical data from the start of the operations to the issuance of the trigger signal (Step B10).

Then, the processing of Step B6–B11 is repeatedly executed until the execution of the operation programs or the jog motions are completed. When it is determined that the execution of the operation programs or the jog motions are completed (B11), the historical data from the start to the end of execution of the operation programs and the reduced images (icon) of the three-dimensional models of the robots at the end of the operation programs are stored in a pair (Step B12). Thus, the images of the three-dimensional models of the robots in the midst of the operations with the historical data are successively stored in the data storage section 5.

Figure 5:
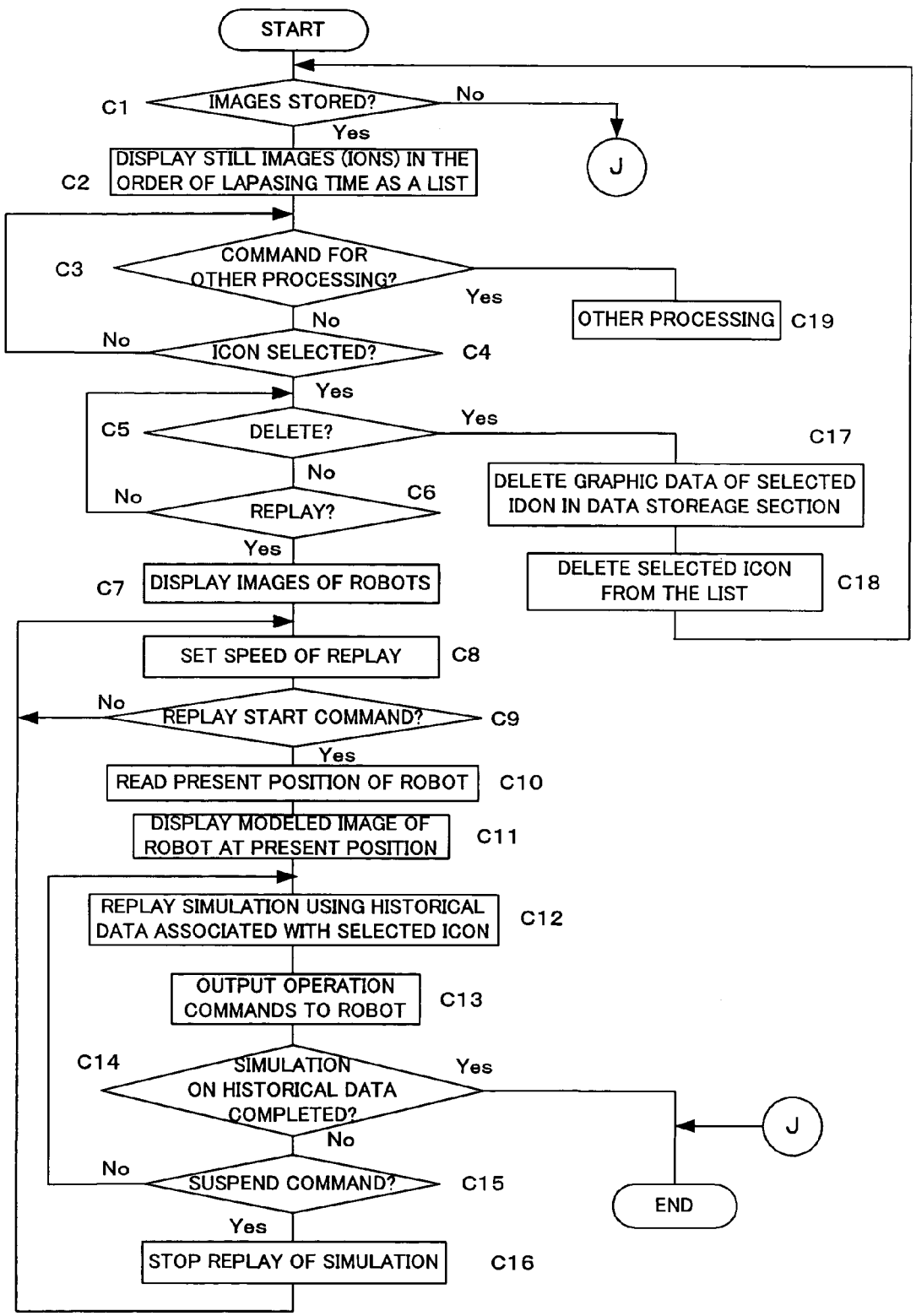
FIG. 5 is a flowchart of processing for replaying the simulation from a start to a midst of the operation.

For confirming the operation state of the robot or robots in the midst of the operation and the simulation from the start to the midst of the operation, an operator inputs a command for displaying a list of the images of the robot or robots to the simulation device. The simulation device start the processing as shown in FIG. 5.

It is determined whether or not the images are stored (Step C1). Specifically, it is determined whether or not the processing of Step A10 or the processing of Step B10 has been performed and the graphic data in the midst of operation and the historical data are stored. If the images are not stored, the procedure of this processing period is terminated. If the images are stored, the stored images are displayed in the order of lapsing time as a list (Step C2).

As described, in the processing of A10 or B10, the images are reduced and the reduced images are stored as icons. The icons are displayed in the order of lapsing time (in the order of issuances of the capturing trigger signal.) Also as described, in the case where the images of the three-dimensional models are not reduced and directly stored, the original images are displayed as a list. In this case, the original images are reduced and the reduced images are displayed as icons. Alternatively, the original images are directly displayed on the screen of the display devices if possible. Is it is not possible to display the original images in the screen at a time, the original images are successively displayed in the order of lapsing time in the screen in response to an operation of a page key, etc.

Figure 7:
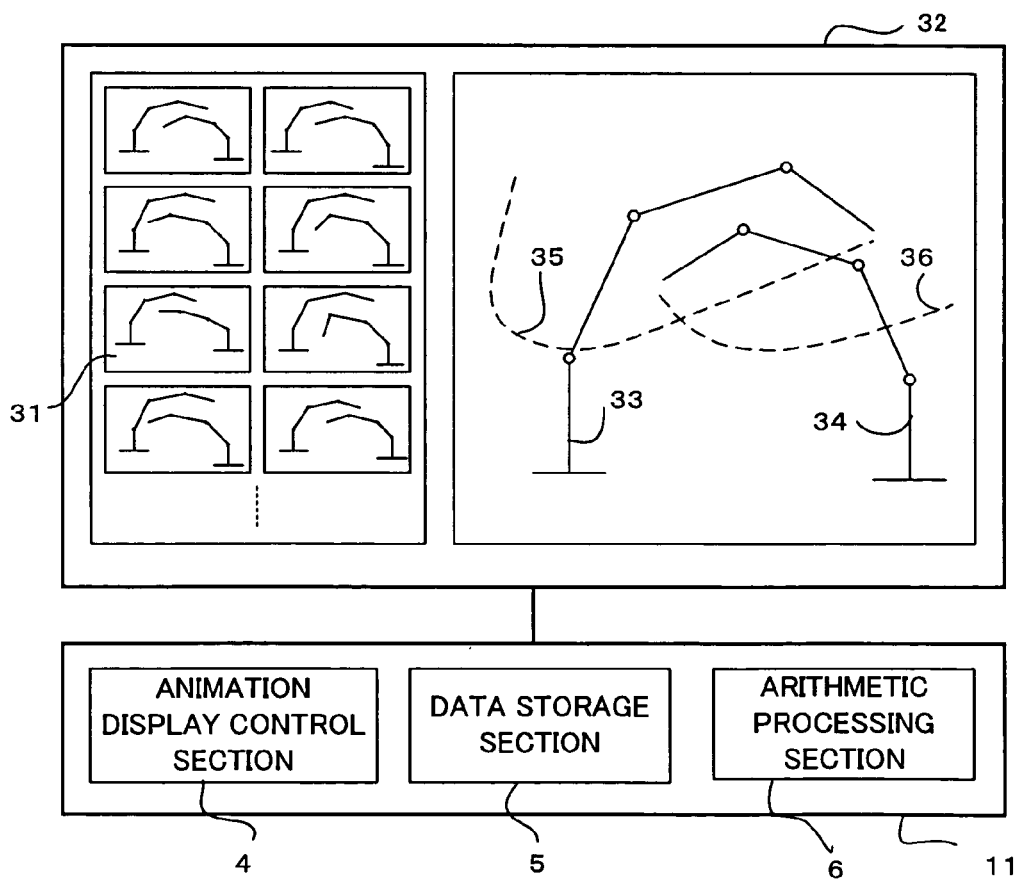
FIG. 7 is a schematic diagram of the simulation device displaying icons of the modeled images as a list and replay of the simulation to the midst of the operation.

FIG. 7 shows an example of displayed icons on the screen of the display device of the simulation device. This example shows a case in which operations of two robots 33 and 34 constituting a robot system are simulated by performing the processing shown in FIG. 4 by the simulation device 11 as shown in FIG. 2. As shown in FIG. 7, icons 31 obtained in Step B10 are displayed on the display device 32 in the order of time of capturing these images.

Then, it is determined whether or not a command other than a command of selecting one of the displayed icons is inputted and if the other command is inputted (Step C3), processing for executing the other command is performed (Step C19). If it is determined that one of the icons displayed on the display device is selected by a pointing device such as mouse (Step C4), it is further determined whether or not a deletion command for deleting the selected icon or a replay command for replying the simulation is inputted (Step C5, Step C6). If the deletion command is inputted, the graphic data on the selected icon are deleted from the data storage section (Step C17), and the selected icon is deleted from the list of the icons on the display device (Step C18) and the procedure returns to Step C1.

When it is determined that the replay command is inputted at Step C6, the images 33 and 34 of the three-dimensional models of the robots are displayed on the screen 32 of the display device 3 based on the positional information on respective axes of the robots at a start of the operations stored associated with the selected icon, as shown in FIG. 7 (Step C7). A message prompting an operator to set a speed of replay is displayed (Step C8). An operator inputs the speed of replay and a command for starting the replay.

When it is determined that the speed of reply and the replay start command are inputted (Step C9), the present positions of the robots are read (Step C10) and the images of the three-dimensional models of the robots are displayed at the present positions (Step C11). The simulation of the operations of the robots are replayed by animation by moving the images 33 and 34 of the three-dimensional models at the set speed based on the historical data (the lapsing time information and the positional information associated with the lapsing time information) associated with the selected icon (Step C12). In this replay, loci 35 and 36 of the controlled points of the robots (which may be set to tool center points of the robots, respectively) are displayed.

Further, the operation commands are outputted to the robots to be operate to move to the commanded positions according to the simulation results (Step C13). It is determined whether or not the simulation based on the historical data associated with the selected icon is completed (Step C14). If the historical data remain, it is further determined whether or not a suspend command is inputted (Step C15). If the suspend command is not issued, the procedure returns to Step C12 and the processing of Step C12 and the subsequent Steps is performed.

If the suspend command is issued, the replay of simulation is stopped (Step C16) and the procedure returns to Step C8 to enable setting of the replay speed and waits until a replay start command is issued. The displayed images of three-dimensional models of the robots are stopped as still images on the screen of the display device 3 until the operator inputs a replay start command, to allow the operator to observe details of the operation state of the robots.

When the operator inputs a replay start command with or without altering the replay speed, the processing of Steps 10 and subsequent Steps is performed, so that the simulation of the robot operations is performed at the set replay speed based on the read historical data and the robots are operated in accordance with the simulation.

Thus, when it is determined that the simulation is performed to end of the stored historical data (Step C14), the simulation is terminated.

In the case where the operation program or the jog motion command is executed by the arithmetic processing section of the simulation device or by the control simulator (controller of a virtual robot) and the historical data and icons of the three-dimensional model of the robot, there is no robot actually performing the commanded operation in Step 13, in such a case, the commanded operation may be performed by a robot in the system by selecting the robot to perform the operation. Particularly, the robot to perform the commanded operation is selected using an ID code in advance and the operation commands are inputted to the selected robot.

Further, in the above embodiment, one of the icons of the three-dimensional model of the robot on the display device is selected and the simulation from a start of operation to a state indicated by the selected icon is replayed. Alternatively, a simulation from the state indicated by the icon to the end of operation may be performed. Further, two of the icons on the display device may be selected and the simulation of the robot between the first icon and the second icon may be replayed.

For replaying the simulation from the state indicated by the selected icon to the end of operation, an icon is selected as a start position of the replay of the simulation at Step C4 in FIG. 5. At Step C12, the historical data associated with the last icon; i.e. the historical data at the end of execution of the operation program stored at Step A12, or Step R12, are read. In the read historical data associated with the last icon, the positional information subsequent to the positional information at the last lapsing time in the historical data associated with the selected icon are read in the order of lapsing time, so that the replay of the simulation from the state indicated by the selected icon to the end of the simulation is performed.

For replaying the simulation, between the states indicated by the selected two icons, the first icon and the second icon are selected as start and end positions of the replay of the simulation, respectively, at Step C4. At Step C12, the historical data associated with the selected second icon are read, and in the read historical data associated with the second icon, the positional information subsequent to the positional information at the last lapsing time in the historical data associated with the selected first icon are read in the order of lapsing time, so that the replay of the simulation from the state indicated by the selected first icon to the state indicated by the selected second icon is performed.

The simulation device of the present invention allows an operator to confirm an operation state of a machine in the midst of an operation by referring to still images of a model of the machine on the display device and to observe simulation of a part of the operation by animation.

What is claimed is:

1. A simulation device for simulating an operation of a machine which operates in accordance with an operation program or an operation command, said simulation device comprising:

receiving means for receiving lapsing time information of the operation of the machine and positional information of the machine associated with the lapsing time information;

simulation display means for displaying an image of a model of the machine on a display device by animation to perform simulation of the operation of the machine based on the received lapsing time information and positional information;

capturing means for capturing images of the model of the machine obtained by said simulation display means in the simulation and reduceing the captured images of the model of the machine;

storing means for storing the reduced images to be associated with the lapsing time information and the positional information to the time of capturing of the respective images of the model of the machine;

display control means for displaying the reduced images on the display device in the order of lapsing time based on the stored lapsing time information;

replay means for replaying a part of the simulation of the operation of the machine designated by at least one reduced image selected by an operator from the reduced images displayed on the display device based on the lapsing time information of the operation of the machine and the positional information of the machine associated with the reduced image selected by the operator; and replay control means for suspending the replay of the simulation to allow altering of a replay speed of the replay of the simulation and restarting the replay of the simulation.

2. The simulation device according to claim 1, wherein the suspending of the replay of the simulation to alter the replay speed and the restarting of the replay of the simulation are performed with respect to another machine which operates simultaneously with said machine.

3. A simulation device for simulating an operation of a machine, comprising:

receiving means for receiving lapsing time information of the operation of the machine and positional information of the machine associated with the lapsing time information;

simulation display means for displaying an image of a model of the machine on a display device by animation to perform simulation of the operation of the machine based on the received lapsing time information and positional information;

capturing means for capturing images of the model of the machine obtained by said simulation display means in the simulation;

storing means for storing the captured images to be associated with the lapsing time information and the positional information to the time of capturing of the respective images of the model of the machine;

display control means for reducing the captured images and displaying the reduced images on the display device in the order of lapsing time based on the stored lapsing time information;

replay means for replaying a part of the simulation of the operation of the machine designated by at least one of reduced image selected by an operator based on the lapsing time information of the operation of the machine and the positional information of the machine associated with the reduced image selected by the operator; and replay control means for suspending the replay of the simulation to allow altering of a replay speed of the replay of the simulation and restarting the replay of the simulation.

4. The simulation device according to claim 3, wherein the suspending of the replay of the simulation to alter the replay speed and the restarting of the replay of the simulation are performed with respect to another machine which operates simultaneously with said machine.

* * * * *

UNITED STATES PATENT AND TRADEMARK OFFICE
CERTIFICATE OF CORRECTION

PATENT NO. : 7,194,396 B2
APPLICATION NO. : 10/290538
DATED : March 20, 2007
INVENTOR(S) : Atsushi Watanabe et al.

It is certified that error appears in the above-identified patent and that said Letters Patent is hereby corrected as shown below:

On the title page, item [56]:

Page 2, Column 1 (Other Publications), Line 2, change "Scheduleing" to --Scheduling--.

In the drawings:

FIG. 5, Box. C2, Line 2, change "LAPASING" to --LAPSING--.

FIG. 5, Box. C17, Line 2, change "IDON" to --ICON--.

FIG. 5, Box. C17, Line 2, change "STOREAGE" to --STORAGE--.

Column 1, Line 31, change "i.c." to --i.e.--.

Column 1, Line 53, change "m" to --in--.

Column 3, Line 7, change "sowing" to --showing--.

Column 3, Line 30, after "from" insert --a--.

Column 3, Line 31, after "disk" insert --,--.

Column 4, Line 7, change "tie" to --the--.

Column 4, Line 16, change "tie" to --the--.

Column 4, Line 27, change "controller." to --controllers--.

Column 5, Line 1, after "in" change "a" to --an--.

Column 5, Line 9, after "simulated" insert --,--.

Column 5, Line 12, change "Than," to --Then,--.

Column 5, Line 25, after "execution" insert --steps--.

Column 5, Line 26, before "operation" insert --controller of the robot can be used as the time information in execution of the--.

UNITED STATES PATENT AND TRADEMARK OFFICE
CERTIFICATE OF CORRECTION

| | |
|---|---|
| PATENT NO. | : 7,194,396 B2 |
| APPLICATION NO. | : 10/290538 |
| DATED | : March 20, 2007 |
| INVENTOR(S) | : Atsushi Watanabe et al. |

It is certified that error appears in the above-identified patent and that said Letters Patent is hereby corrected as shown below:

Column 5, Line 45, after "signal is" insert --captured as a still image of the model of the robot in the midst of the--.

Column 5, Line 53, after "completed" insert --,--.

Column 6, Line 3, change "the," to --the--.

Column 6, Line 39, change "D3)," to --B3),--.

Column 6, Line 60, change "B9.)" to --B9).--.

Signed and Sealed this

Twentieth Day of November, 2007

JON W. DUDAS
*Director of the United States Patent and Trademark Office*